July 5, 1949.  J. J. OSPLACK  2,475,045
LEAD SCREW AND METHOD OF MAKING THE SAME
Filed April 4, 1945
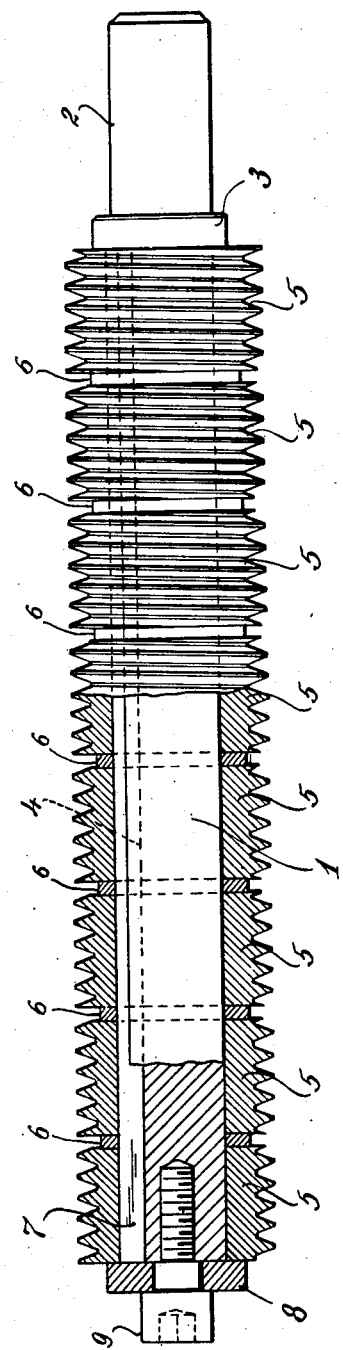
INVENTOR
JOSEPH J. OSPLACK
BY
Pennie, Davis, Marvin & Edmonds
ATTORNEYS Patented July 5, 1949

2,475,045

UNITED STATES PATENT OFFICE 2,475,045

LEAD SCREW AND METHOD OF MAKING THE SAME

Joseph J. Osplack, Detroit, Mich., assignor to Vinco Corporation, Detroit, Mich., a corporation of Michigan Application April 4, 1945, Serial No. 586,605

11 Claims. (Cl. 74—459)

This invention relates to lead screws for machine tools and the like, and to methods of making the same whereby lead screws are produced which are accurate to much smaller tolerances than possible to obtain in the manufacture of lead screws consisting, as at present customary, of a single piece of metal.

In the manufacture of machine parts by the usual steps of machining, grinding and polishing, tolerances to one ten thousandth of an inch may be maintained and accuracy within such limits is in most instances all that is required. In the manufacture of lead screws, however, the error is cumulative, and even though the error be less than .0001 per inch of screw length, the resultant screw will have an overall error too great for use except where wide tolerances in the work to be produced are permissible. It has been the practice to manufacture lead screws by hand, which is extremely costly, and although the cumulative error is reduced, the resulting screws are not uniform and each reflects the skill of the maker.

According to my improved method a lead screw can be produced in an ordinary screw-making and finishing machine which has no cumulative error and which costs but little more than the ordinary machining, grinding and finishing operations required to produce lead screws for machine tools where close tolerances in the finished work are not required.

In the accompanying drawing my improved lead screw is shown in part in side elevation and in part in longitudinal section.

The lead screw consists of a central arbor 1 having a bearing 2 at one end with a shoulder 3 between the threaded portion of the screw and the bearing. The arbor has a keyway 4 extending throughout the length of the threaded portion, and fitted on the arbor are short threaded sleeve sections 5 separated from each other by spacing washers 6 having an external diameter slightly less than the root diameter of the threads of the sections 5. The threaded sections 5 and the spacing washers 6 are provided with keyways and are attached to the arbor 1 by a single key 7 extending throughout the length of the threaded portion of the arbor.

The sections 5 and spacing washers 6 are held against longitudinal movement of the arbor by means of a collar 8 clamped against the end of the arbor and the adjacent threaded section 5 by a screw 9 whose head is ground to form a bearing surface for the screw. In the manufacture of the lead screw the parts are assembled as described but with the sections 5 unthreaded, that is to say, the sections 5, when the parts are originally assembled, are sleeves of uniform length and of proper diameter for the forming and grinding of the thread. The thread is then formed and ground in the same manner as though it were a single piece of metal, no more than ordinary care in the operation of the machine being required. After the thread is formed and ground each threaded section is carefully checked to determine the over-all error in each section. The lead screw is then taken apart and the spacing washers 6 are then recalibrated by grinding down if too thick, or by substituting a thicker washer where too thin, to thereby individually correct for the error found in each section of the screw.

It is a comparatively simple operation to finish metal disks such as the washers 6 to exact thickness with great accuracy. The parts are then reassembled and the resulting screw has no cumulative error, but throughout will be as accurate as each short section.

If close tolerances are required in the work for which the machine is to be used, the lead screw can be made of very short sections, while if greater tolerances are permitted the sections may be longer.

Instead of employing a single key for attaching the sleeve sections and separating washers to the arbor, the parts may be provided with matching splines, or any other satisfactory method may be employed for attaching the assembled sections and washers to the arbor, so that the assembly will function as though formed of a single piece of metal.

The above described procedure may be variously modified. For example, the screw thread may be formed in a continuous length of tubing of the same outer and inner diameter as the tube sections 5, and the long threaded section thereafter cut into short sections and assembled on the arbor in the manner described. It is to be understood that the invention is not limited to the specific steps herein described except insofar as such steps are recited in the accompanying claims.

I claim:

1. A lead screw for machine tools consisting of a plurality of separate screw sections, spacers between certain of said screw sections, the spacers having an external diameter not exceeding the root diameter of the threads on the screw sections and being of individually calibrated thickness to compensate for manufacturing error in the threads of the sections, and means cooperating with said sections and said spacers for holding them in a predetermined relation to form a unitary lead screw.

2. A lead screw for machine tools consisting of a plurality of separate screw sections, spacers between certain of said screw sections, the spacers having an external diameter not exceeding the root diameter of the threads on the screw sections and being of varying thickness to compensate for manufacturing error in the threads of the sections, and means cooperating with said sections and said spacers for holding them in a predetermined relation to form a unitary lead screw.

3. A lead screw consisting of an arbor, a plurality of separate threaded sections mounted on said arbor, spacing washers mounted on said arbor intermediate said sections, said spacing washers having an external diameter not exceeding the root diameter of the threads of said screw sections and being of varying thickness to compensate for manufacturing error in the threads of the threaded sections, and means for holding said sections and said washers on said arbor in such relation as to form a unitary lead screw.

4. The method of making a lead screw which consists in forming a plurality of separate threaded sections, individually calibrating axially the threads of said sections, individually calibrating the thickness of a plurality of washers to compensate for the manufacturing error in said threaded sections and assembling the sections and washers into a continuous screw.

5. The method of forming lead screws which consists in assembling a plurality of separate sleeve sections on an arbor with washers interposed between said sections, continuously forming a lead screw in the outer surface of said assembled sleeve sections, individually calibrating the overall lead between the extreme threads on each section, individually correcting the thickness of the separating washers to compensate for manufacturing error in each threaded section and reassembling the threaded sections and washers to form a lead screw.

6. A lead screw for machine tools comprising a plurality of separate screw sections, spacers between certain of said screw sections, the spacers having an external diameter not exceeding the root diameter of the threads of said screw sections and being of individually calibrated thickness to compensate for manufacturing error in the threads of the sections, and means cooperating with said sections and said spacers for holding them in a predetermined relation to form a unitary lead screw, the threads of at least some of the adjacent sections being of the same pitch and of the same hand and the spacers between such sections being of such thickness and the threads of such sections being so constructed and arranged that they cooperate to form said unitary lead screw.

7. A lead screw for machine tools comprising a plurality of separate screw sections, spacers between certain of said screw sections, the spacers having an external diameter not exceeding the root diameter of the threads of said screw sections and being of varying thickness to compensate for manufacturing error in the threads of the sections, means cooperating with said sections for holding them in a predetermined relation to form a unitary lead screw, the threads of at least some of the adjacent sections being of the same pitch and of the same hand and the spacers between such sections being of such thickness and the threads of such sections being so constructed and arranged that they cooperate to form said unitary lead screw.

8. A lead screw for machine tools comprising an arbor, a plurality of separate threaded screw sections mounted on the arbor, spacing washers mounted on the arbor intermediate said sections, and means for clamping said sections and washers on said arbor to form a unitary lead screw, said spacing washers having an external diameter not exceeding the root diameter of the threads of said screw sections and being of varying thickness to compensate for manufacturing error in the threads of the threaded sections, the threads of at least some of the adjacent sections being of the same pitch and of the same hand and the spacing washers between such sections being of such thickness and the threads of such sections being so constructed and arranged that they cooperate to form said unitary lead screw.

9. The method of making a lead screw which comprises forming a plurality of separate threaded sections, the threads of which have the same pitch and the same hand, individually calibrating axially the threads of said sections, individually calibrating the thickness of a plurality of washers to compensate for the manufacturing error in said threaded sections, and assembling the sections and washers so that the threads of adjacent sections cooperate to form a continuous lead screw.

10. The method of making a lead screw which comprises forming a plurality of threaded sections, individually calibrating axially the threads of said sections to determine the manufacturing error present in them, individually calibrating the thickness of a plurality of washers to compensate for manufacturing error in said threaded sections, assembling said sections axially with respect to each other on an arbor in a predetermined position with respect to the arbor, with the calibrated washers between them, and fastening said assembled sections and washers together rigidly on the arbor to form a unitary lead screw.

11. The method of making a lead screw which comprises forming a plurality of threaded sections, each having a central opening with a keyway extending therefrom, individually calibrating axially the threads of said sections to determine manufacturing error present in them, individually calibrating the thickness of a plurality of washers to compensate for manufacturing error in said threaded sections, assembling said sections axially with respect to each other on an arbor with the key-ways thereof extending around a longitudinally extending key of the arbor, with the calibrated washers between them, and clamping the assembled sections and washers rigidly together on said arbor to form a unitary lead screw.

JOSEPH J. OSPLACK.

REFERENCES CITED

The following references are of record in the file of this patent:

UNITED STATES PATENTS

| Number | Name | Date |
|---|---|---|
| 1,144,137 | Kennedy | June 22, 1915 |
| 1,165,933 | Allquist | Dec. 28, 1915 |
| 1,794,907 | Kelly | Mar. 3, 1931 |
| 2,101,117 | Weston | Dec. 7, 1937 |
| 2,174,814 | Ackerman | Oct. 3, 1938 |
| 2,331,882 | Almquist | Oct. 19, 1943 |

FOREIGN PATENTS

| Number | Country | Date |
|---|---|---|
| 65,401 | Switzerland | Mar. 19, 1913 |
| 108,827 | Austria | Feb. 10, 1928 |
| 120,307 | Great Britain | Nov. 7, 1918 |
| 292,205 | Germany | May 30, 1916 |